United States Patent [19]

Nady

[11] 4,215,431
[45] Jul. 29, 1980

[54] WIRELESS TRANSMISSION SYSTEM
[76] Inventor: John Nady, 1250 Rose St., Berkeley, Calif. 94702
[21] Appl. No.: 950,574
[22] Filed: Oct. 12, 1978

Related U.S. Application Data

[63] Continuation-in-part of Ser. No. 842,152, Oct. 14, 1977, abandoned.

[51] Int. Cl.³ ............................................. H04B 1/62
[52] U.S. Cl. ...................................... 455/43; 333/14; 455/72; 455/100
[58] Field of Search ..................... 325/45, 46, 62, 102, 325/111, 118; 179/1 P; 333/14

[56] References Cited

U.S. PATENT DOCUMENTS

| | | | |
|---|---|---|---|
| 2,840,694 | 6/1958 | Morgan | 325/111 |
| 3,667,047 | 5/1972 | Iwasaki et al. | 325/45 |
| 3,718,862 | 2/1973 | Norris | 325/119 |
| 4,103,239 | 7/1978 | Meewezen | 325/62 |
| 4,136,314 | 1/1979 | Blackmer et al. | 333/14 |

OTHER PUBLICATIONS

"A Wide Dynamic Range Noise Reduction System"–David E. Blackmer db–The Sound Engineering Magazine, Aug.–Sep. 1972.

Primary Examiner—Marc E. Bookbinder
Attorney, Agent, or Firm—Craig & Antonelli

[57] ABSTRACT

A wireless transmission system for substantially noise-free transmission including a portable, battery powered, self contained transmitter for transmitting signals representative of an audio input to a remote receiver. The transmitter includes noise reduction encoding circuitry for processing a transduced audio input signal and providing a processed output signal to a transmission unit for transmission to the remote receiver. The remote receiver receives the transmitted signals and supplies the received signals to a reception unit including noise reduction decoding circuitry for processing the received signal and providing an audio signal output with improved signal to noise ratio to a utilization device.

8 Claims, 5 Drawing Figures

WIRELESS TRANSMISSION SYSTEM

This application is a continuation-in-part of my application Ser. No. 842,152, filed Oct. 14, 1977, the subject matter of which is incorporated by reference herein and now abandoned.

The present invention relates to wireless or cordless transmission systems arranged for connection with microphone transducers or other types of audio transducers such as musical instrument sound transducers.

Wireless or cordless microphone systems, which are battery powered, portable, self contained systems and thereby eliminate the need for power cords and wire connections are known in the art as, for example, disclosed in U.S. Pat. No. 3,564,416 issued Feb. 16, 1971 and U.S. Pat. No. 3,718,862 issued Feb. 23, 1973. Additionally, wireless transmission systems particularly adapted for musical instruments are known as disclosed, for example, in U.S. Pat. No. 3,296,916 issued Jan. 10, 1967 and, in particular, for an electric guitar are known as, for example, disclosed in U.S. Pat. No. 3,901,118 issued Aug. 26, 1975. Such transmission systems and particularly those utilized for musical instruments suffer from the problem of excessive background noise due to inherent limitations of the transmission process and random minor radio noise interference of various types.

It is therefore an object of the present invention to provide a portable, battery powered, self contained wireless transmission system which overcomes the noise problem of the prior art.

It is another object of the present invention to provide a wireless microphone system utilizing solid-state compression/expansion noise reduction signal processing for enabling substantially noise-free wireless microphone transmission.

It is a further object of the present invention to provide a wireless microphone system having a transmitter with integrated circuit noise reduction encoding circuitry and a receiver with integrated circuit noise reduction decoding circuitry so as to enable substantially noise-free transmission and particularly adapted for musical instruments.

In accordance with the present invention, the portable, battery powered, self contained wireless transmission system includes a small, battery powered, self contained transmitter connected to a transducer for converting audio or like inputs into an electrical signal which is supplied to a noise reduction encoding unit utilizing integrated circuits and having a mid band preemphasis circuit and an average value detection compression circuit. The output of the noise reduction encoding unit is supplied to an RF modulator and transmitter unit which transmits the signal to the receiver via an output antenna. The receiver includes an input antenna which supplies the received signals to an RF receiver and demodulator unit providing an output to a noise reduction decoding unit. The noise reduction decoding unit, which operates in opposition to the noise reduction encoding unit of the transmitter, also utilizes integrated circuits and includes a mid band deemphasis circuit and an average value detection expansion circuit. The output of the noise-reduction decoding unit is then supplied to a utilization device such as a loudspeaker system. The noise reduction encoding and decoding units operate only upon the transduced audio signal producing compression and expansion of the dynamic range of the signal in such a manner as to permit transmission of the full audio spectrum of 20–20,000 Hz at a quality which permits its use with musical instrument and microphone sound transducers.

These and further objects, features and advantages of the present invention will become more obvious from the following description when taken in connection with the accompanying drawings which show, for purposes of illustration only, a single embodiment in accordance with the present invention; and wherein FIG. 1 is a perspective view of the wireless transmission system of the present invention in connection with an electric guitar and a loudspeaker system;

Figure 1:
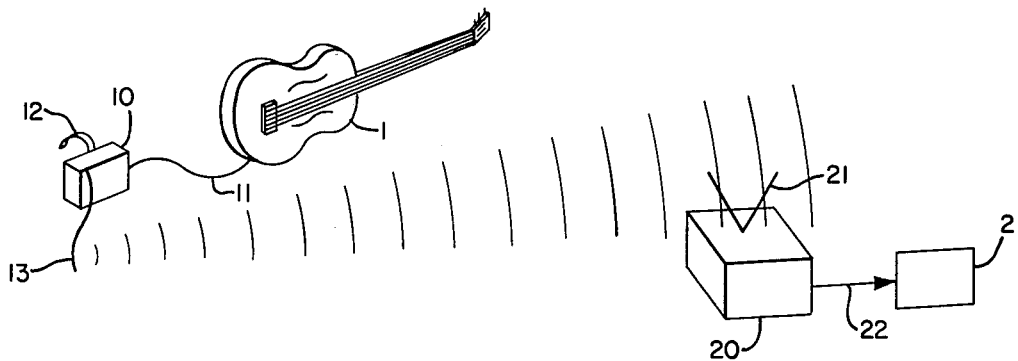

Referring now to the drawings, there is shown in FIG. 1, the wireless microphone system of the present invention utilized with an electric guitar 1 and a utilization device 2 such as a loudspeaker system. The wireless microphone system includes a small, cigarette package-like size, battery powered transmitter 10 coupled by a lead 11 to a transducer (not shown), particularly of a type known in the art utilized with guitars and mounted in or on the guitar. The transmitter 10 weighs approximately 4 ounces without the battery and is adapted to be carried by the musician as, for example, by a clip 12 attachable to the musician's belt. Alternatively, the transmitter 10 may be mounted with the transducer in or on the guitar. The transmitter processes the signal from the transducer and transmits its output via an antenna 13 which may be in the form of a flexible wire antenna to the receiver 20. The receiver 20, which is about the size of a six beverage can carton and is a.c. powered, includes an input antenna 21 and processes the received signal supplying an output at 22 to the utilization device 2.

Figure 2:
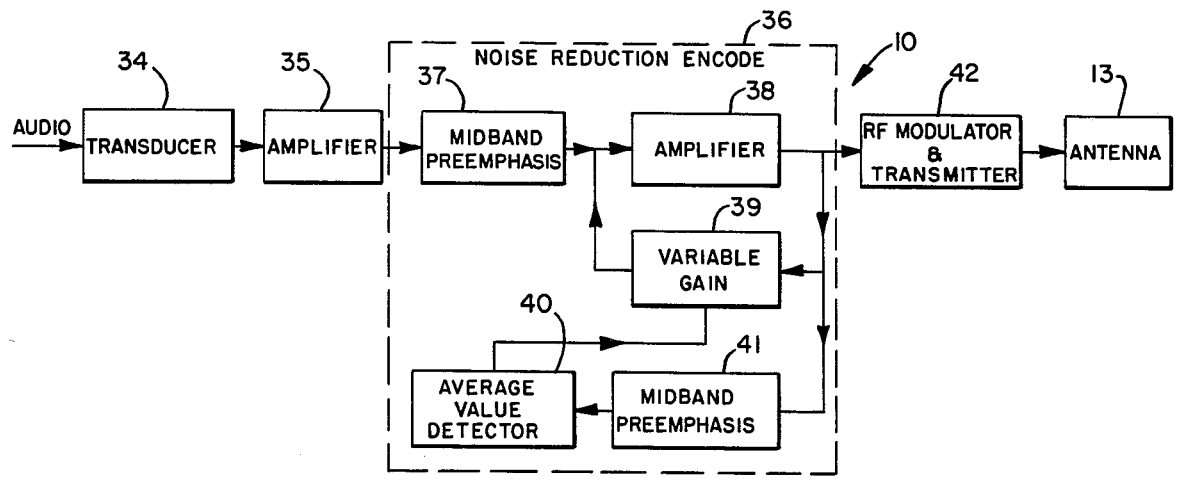
FIG. 2 is a block diagram of the transmitter of the present invention.

FIG. 2 illustrates the transmitter 10 in block diagram form with a transducer 34 for converting the audio or like input to an electric signal for application to the noise-reduction encoding unit 36 via an amplifier and buffer stage 35. The unit 36 includes a mid band preemphasis circuit 37 providing preemphasis in the range of 400 Hz to 3000 Hz and supplying an output to an amplier stage 38 having a variable gain stage 39 connected in the feedback path thereof. The gain of the variable gain stage 39 is controlled by an average value detector 40 with the signal for driving the detector passing through a preemphasis circuit 41 providing preemphasis in the frequency band range of 400 Hz to 3000 Hz. The noise reduction encoding unit 36 operates only on the transduced audio signal at a compression ratio of about 2:1 with the output of the unit 36 being supplied to an RF modulator and transmitter unit 42 enabling fixed frequency operation, for example, in the VHF band or tunable operation, for example, in the 88–108 mHz frequency range, which unit 42 outputs the signal via the antenna 13.

Figure 3:
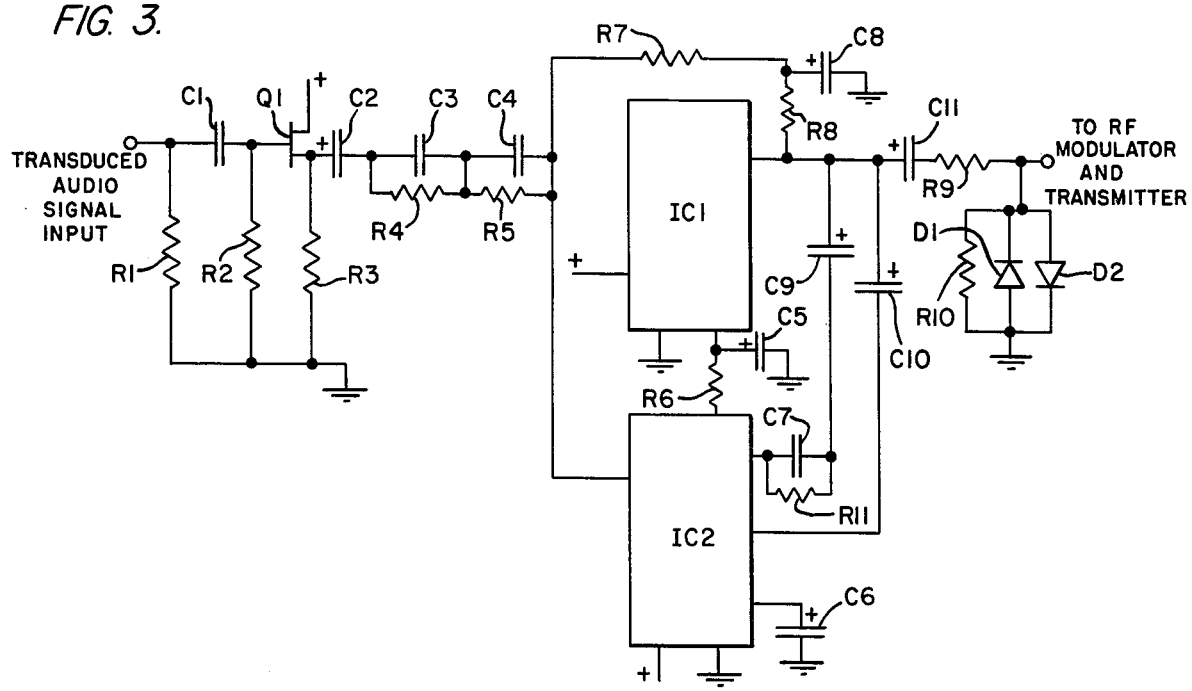
FIG. 3 is a schematic circuit diagram of a portion of the transmitter circuitry.

FIG. 3 is a schematic diagram of a portion of the transmitter circuitry illustrated in FIG. 2. The transduced audio signal is applied to the circuit through an input buffer stage consisting of Q1, R1, R2, R3, C1, and C2. This stage presents a high input impedance to properly match the audio transducers with the value R1 being varied as necessary for the various types of audio transducers. The transistor Q1 may be of the type 2N5458. The network consisting of R4, R5, C3, and C4 provides 12 db of preemphasis in the frequency band 400 Hz to 3000 Hz which is necessary to prevent breathing effects and maximize the noise reduction capabilities of the circuit. The actual compression occurs in the circuitry containing the integrated circuits IC1 and IC2. IC1 may be a commercially available integrated circuit type LM747 while IC2 may be a commercially available integrated circuit type NE570. IC2 contains a variable gain stage which is connected in the feedback path of an amplifier stage contained in IC1 with the components R6, R7, R8, C5, and C8 serving for setting the proper amplifier bias levels. IC2 also contains an average value detector to control the gain of the variable gain stage with the signal for driving this detector passing through a preemphasis circuit consisting of R11 and C7 which provides 12 db of preemphasis in the 400 hz to 3000 Hz frequency band. The time constant of the average value detector is set by C6 which is chosen for lowest distortion and fastest circuit response time. The compressed signal then passes through a network consisting of R9, R10, C11 which reduces the signal to the proper level for application to the RF modulator and transmitter unit. The diodes D1 and D2 act as a clipper circuit to prevent overmodulation.

Figure 4:
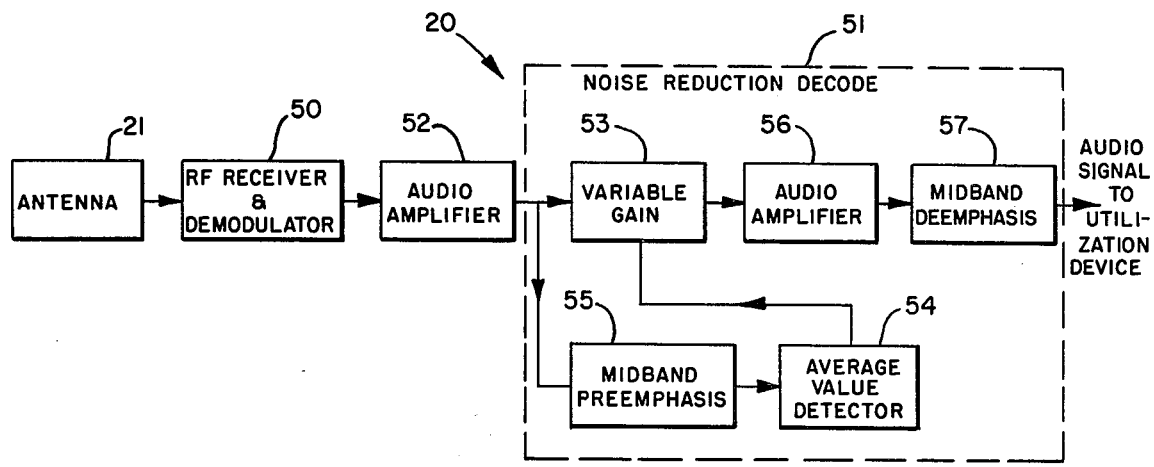
FIG. 4 is a block diagram of the receiver of the present invention.

The transmitted signal, which may be reliably transmitted, for example, over a distance of approximately 250 feet, is received by the receiver 20 as shown in block diagram form in FIG. 4 via the antenna 21. The received signal is supplied by the antenna to an RF receiver and demodulator unit 50 which provides a demodulated compressed output to a noise-reduction decoding unit 51 corresponding to the noise-reduction encoding unit 36 of the transmitter 10 via an amplifier 52. The unit 51 includes a variable gain stage 53 whose gain is determined by a signal derived from an average value detector 54 driven by a preemphasis circuit 55 providing emphasis in the 400 Hz to 3000 Hz frequency band range. The unit 51 also includes an amplifier stage 56 and a midband deemphasis circuit 57 providing deemphasis in the 400 Hz to 3000 Hz frequency band range to match the input preemphasis of the encoding unit 36 with the unit 51 operating at an expansion ratio of about 2:1. The unit 51 provides an output corresponding to the transduced audio input signal at 22 which is supplied to a utilization device such as a loudspeaker system.

Figure 5:
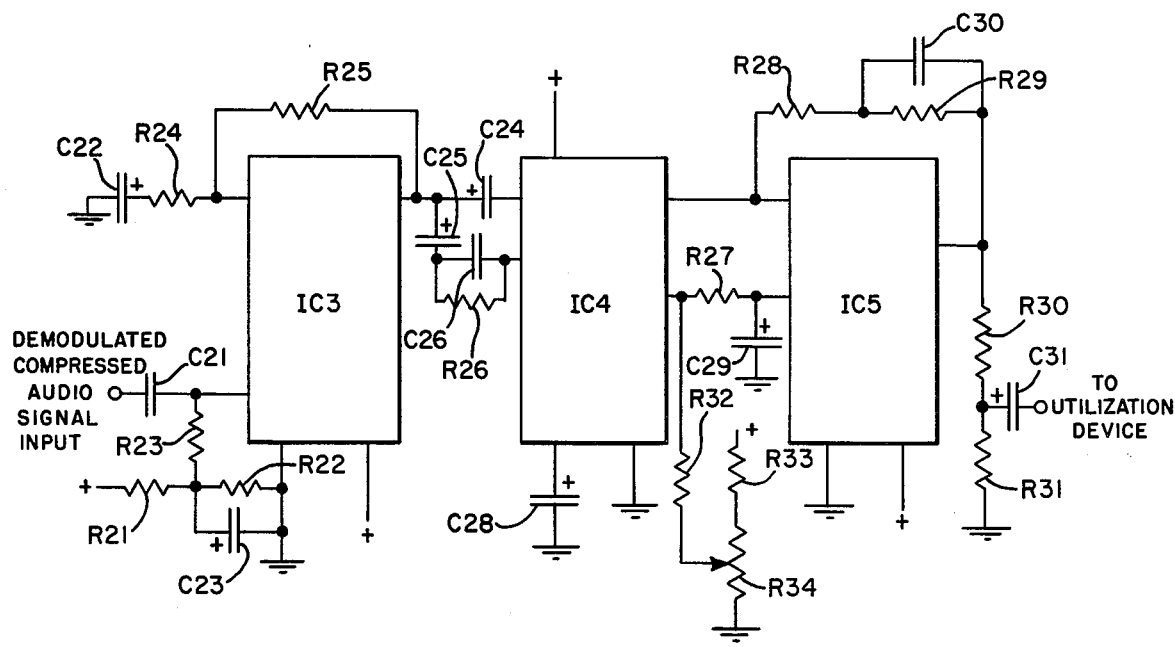
FIG. 5 is a schematic circuit diagram of a portion of the receiver circuitry.

FIG. 5 is a schematic diagram of a portion of the receiver circuitry illustrated in FIG. 4. The demodulated compressed audio signal from the ratio frequency receiver is supplied to the circuit through an amplifier stage consisting of C21–C23, R21–R25, and IC3. The gain of this amplifier stage is set by R24 and R25 to be about 4. The signal then passes through a variable gain amplifier stage consisting of IC4 and IC5. The gain of this variable gain amplifier stage is determined by a signal derived from an average value detector contained in IC4. The signal to drive the detector receives 12 db of preemphasis in the 400 Hz to 3000 Hz range from the network C26–R26 which matches a similar preemphasis in the compressor circuit. The time constant of the detector is set by C28, also to match the time constant of the detector in the compressor circuit. The network consisting of R32–R34 permits adjustment of the circuit for minimum distortion, while R27–C29 serve for setting the amplifier bias level. The deemphasis network of R28, R29, and C30 provides a 12 db deemphasis in the 400 Hz to 3000 Hz range to match the input preemphasis of the compressor circuit while R30 and R31 provide the proper output level. The output signal from the expansion circuitry is now identical to the signal from the audio transducer which formed the input to the compression circuitry. All parameters are selected to maximize signal-to-noise ratio and dynamic range, while minimizing distortion, and permitting the full audio spectrum of 20–20,000 Hz to be transmitted, IC3, IC4 and IC5 may be commercially available integrated circuits as for example, types LM747, NE570 and NE5534, respectively.

While signal noise reduction systems are known including compression/expansion techniques as, for example, disclosed in the article by David E. Blackmer entitled, "A Wide Dynamic Range Noise Reduction System," published in *db The Sound Engineering Magazine*, Aug.–Sept. 1972, Vol. 6, No. 8, the utilization of a noise reduction system in the wireless transmission system of the present invention provides a new approach to such systems and enables substantially noise-free transmission with signal to noise ratios of 95 to 100 dB being implemented, which features have not been obtained with prior wireless transmission systems. Moreover, the present system enables the substantial elimination of 60 cycle hum and the problem of hiss common to musical instrument transmission systems. Further, the compression/expansion circuitry and, in particular, the average level detection compression/expansion at about a compression/expansion ratio of 2:1 also increases the dynamic range of the transmitted signal with respect to prior art wireless system as described above, thus lowering the distortion figure for larger level signals while the midband emphasis/deemphasis circuits minimize breathing effects caused by low frequency tracking errors. The term "breathing" refers to hiss level changes accompanying audio signal envelope level changes. That is, as the expanding system is changing gain, changes in the background noise level can be heard. Although this breathing is present at any frequency transmitted audio signal, it is particularly recognizable at low frequencies where there is little masking of the noise spectrum by the audio signal. Furthermore, any deviation from ideal instantaneous unity gain through this system will audibly worsen this condition and such gain or loss between the compressor input and expander output is most noticeable at low frequencies. Thus, breathing effects prevent the transmission and reproduction of high quality audio.

It is noted that while the above description has been directed to a wireless transmission system for use with musical instruments, the transmitter may utilize a conventional audio transducer mounted on the transmitter 10 enabling utilization in the manner of a conventional wireless microphone system for voice or other transmission with the resultant improved signal to noise performance and improved high level distortion. Additionally, the system described above is applicable to a wide variety of transmission systems including narrow or wideband FM, AM and other modulation techniques at any typical transmission frequency. Further, the compression/expansion circuitry may be of the RMS-level detected type or any other suitable type providing, the desired essentially noise-free transmission.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A wireless, portable, self-contained transmission system for use with at least one of microphone transducers and musical instrument transducers receiving an audio input and providing a transduced audio signal, said transmission system comprising a portable, battery powered, self-contained transmitter means for transmitting compressed signals to a remote receiver means, said transmitter means including noise reduction compression means responsive only to the transduced audio signal for compressing the transduced audio signal and providing a compressed output signal to a transmission means for transmission to said remote receiver means, said remote receiver means receiving the transmitted compressed signals and supplying a compressed transduced audio signal to noise reduction expansion means corresponding to said noise reduction compression means of said transmitter means, said noise reduction expansion means expanding the transmitted compressed signals for providing an audio output signal with an improved signal to noise ratio to a utilization means whereby substantially noise-free transmission is effected, said noise reduction compression means including amplifier means responsive to the transduced audio signal, variable gain means connected in a feedback path of said amplifier means, said variable gain means having the gain thereof controlled by average value detector means, wherein said average value detector means being driven by an output from a preemphasis means receiving an output of said amplifier means.

2. A wireless transmission system according to claim 1, wherein said preemphasis means provides mid band preemphasis in the 400 Hz to 3000 Hz frequency range, and further comprising additional mid band preemphasis means providing preemphasis in the 400 Hz to 3000 Hz frequency range coupled to an input of said amplifier means.

3. A wireless transmission system according to claim 2, wherein said noise reduction compression means includes integrated circuits.

4. A wireless transmission system according to claim 2, wherein said noise reduction expansion means includes a variable gain means for receiving the compressed, transduced signals, average value detector means for controlling the gain of said variable gain means and being driven by a preemphasis means receiving the compressed, transduced signals.

5. A wireless, portable, self-contained transmission system for use with at least one of microphone transducers and musical instrument transducers receiving an audio input and providing a transduced audio signal, said transmission system comprising a portable, battery powered, self-contained transmitter means for transmitting compressed signals to a remote receiving means, said transmitter means including noise reduction compression means responsive only to the transduced audio signal for compressing the transduced audio signal and providing a compressed output signal to a transmission means for transmission to said remote receiving means, said remote receiver means receiving the transmitted compressed signals and supplying a compressed transduced audio signal to noise reduction expansion means corresponding to said noise reduction compression means of said transmitter means, said noise reduction expansion means expanding the transmitted compressed signals for providing an audio output signal with an improved signal to noise ratio to a utilization means whereby substantially noise-free transmission is effected, said noise reduction expansion means including a variable gain means for receiving the transmitted compressed signals, average value detector means for controlling the gain of said variable gain means and being driven by a preemphasis means receiving the transmitted compressed signals.

6. A wireless transmission system according to claim 4 or 5, wherein said preemphasis means of said expansion means provides preemphasis in the 400 Hz to 3000 Hz frequency range, said variable gain means providing an output to amplification means.

7. A wireless transmission system according to claim 6, wherein said noise reduction expansion means further includes mid band deemphasis means coupled to said amplification means for providing mid band deemphasis in the 400 Hz to 3000 Hz frequency range.

8. A wireless transmission system according to claim 7, wherein said noise reduction expansion means includes integrated circuits.

* * * * *

REEXAMINATION CERTIFICATE (129th)

United States Patent [19]

Nady

[11] B1 4,215,431

[45] Certificate Issued Oct. 11, 1983

[54] WIRELESS TRANSMISSION SYSTEM

[76] Inventor: John Nady, 1250 Rose St., Berkeley, Calif. 94702

Reexamination Request:
No. 90/000,228, Jul. 20, 1982

Reexamination Certificate for:
Patent No.: 4,215,431
Issued: Jul. 29, 1980
Appl. No.: 950,574
Filed: Oct. 12, 1978

Related U.S. Application Data

[63] Continuation-in-part of Ser. No. 842,152, Oct. 14, 1977, abandoned.

[51] Int. Cl.$^3$ .............................................. H04B 1/62
[52] U.S. Cl. ....................................... 455/43; 333/14; 455/72; 455/100
[58] Field of Search ............................ 455/72; 333/14

[56] References Cited

U.S. PATENT DOCUMENTS

| | | | |
|---|---|---|---|
| 2,840,694 | 6/1958 | Morgan . | |
| 3,109,993 | 11/1963 | Blair | 333/14 |
| 3,242,436 | 3/1966 | Brown | 455/72 |
| 3,296,916 | 1/1967 | Palmer . | |
| 3,564,416 | 2/1971 | Price . | |
| 3,624,491 | 11/1971 | Fidi et al. | 333/14 |
| 3,665,345 | 5/1972 | Dolby | 333/14 |
| 3,667,047 | 5/1972 | Iwasaki et al. . | |
| 3,718,862 | 2/1973 | Norris . | |
| 3,732,371 | 5/1973 | Burwen | 179/1 R |
| 3,775,705 | 11/1973 | Dolby | 333/14 |
| 3,901,118 | 8/1975 | Ford . | |
| 4,103,239 | 7/1978 | Meewezen . | |
| 4,136,314 | 1/1979 | Blackmer et al. | 333/14 |

OTHER PUBLICATIONS

Preliminary Specification Linear Integrated Circuits, Analog Compander, NE 570/571, Nov. 1975.
Signetics Compandor Mini-Manual, NE 570/571 Monolithic Dual Compressor/Expander, Sept. 1977.
IEEE Standard Dictionary of Electrical & Electronic Terms, IEEE Std. 100,1972, pp. 40, 394, 502.
"A Monolithic Analog Compander", Craig C. Todd, Dec. 1976, IEEE Journal of Solid State Circuits, vol. SC-11. No. 6.
"A Wide Range Noise Reduction System", David E. Blackmer, db–The Sound Engineering Magazine, Aug.-/Sept. 1972, vol. 6, No. 8.

*Primary Examiner*—Marc E. Bookbinder

[57] ABSTRACT

A wireless transmission system for substantially noise-free transmission including a portable, battery powered, self contained transmitter for transmitting signals representative of an audio input to a remote receiver. The transmitter includes noise reduction encoding circuitry for processing a transduced audio input signal and providing a processed output signal to a transmission unit for transmission to the remote receiver. The remote receiver receives the transmitted signals and supplies the received signals to a reception unit including noise reduction decoding circuitry for processing the received signal and providing an audio signal output with improved signal to noise ratio to a utilization device.

REEXAMINATION CERTIFICATE ISSUED UNDER 35 U.S.C. 307.

WIRELESS TRANSMISSION SYSTEM

THE PATENT IS HEREBY AMENDED AS INDICATED BELOW.

AS A RESULT OF REEXAMINATION IT HAS BEEN DETERMINED THAT:

Claims 1-8 having been finally determined to be unpatentable, are cancelled.

* * * * *